United States Patent [19]

LaBeau et al.

[11] Patent Number: 5,029,824
[45] Date of Patent: Jul. 9, 1991

[54] HYDRAULIC ENGINE MOUNT WITH PRESSURE RELIEF VALVE

[75] Inventors: George A. LaBeau, Dayton; James P. Hamberg, Beavercreek, both of Ohio

[73] Assignee: General Motors Corporation, Detroit, Mich.

[21] Appl. No.: 456,448

[22] Filed: Dec. 26, 1989

[51] Int. Cl.⁵ .............................................. F16M 13/00
[52] U.S. Cl. .................................. 267/140.1; 248/562
[58] Field of Search ................ 248/562; 267/217, 219, 267/140.1 R, 140.1 A; 180/300, 312

[56] References Cited

U.S. PATENT DOCUMENTS

| 3,648,728 | 3/1972 | Perry et al. | 137/525 |
| 4,613,118 | 9/1986 | Morita | 267/140.1 |
| 4,679,779 | 7/1987 | Hodonsky | 267/140.1 |
| 4,765,601 | 8/1988 | Miller et al. | 267/140.1 |

FOREIGN PATENT DOCUMENTS

| 0084221 | 5/1982 | Japan | 267/140.1 |
| 2154699 | 9/1985 | United Kingdom | 267/140.1 |

Primary Examiner—Robert J. Oberleitner
Assistant Examiner—Josie A. Ballato
Attorney, Agent, or Firm—Ronald L. Phillips

[57] ABSTRACT

A hydraulic mount assembly includes a pair of mounting members connected to each other through a hollow elastomeric body. The body is closed by a resilient diaphragm so as to form a cavity for damping liquid. A partition is provided to divide the fluid filled cavity into two distinct chambers. A primary chamber is formed between the partition and the interior wall of the body. A secondary chamber is formed between the partition and the interior wall of the diaphragm. The partition includes at least one orifice track connecting the two chambers. There is further provided a pressure relief valve cooperating with the partition and in fluid communication with the two chambers. The pressure relief valve allows damping liquid to pass directly between the chambers when pressure builds to an undesirably high level. This high pressure circumstance can cause the orifice track to choke off, restricting the primary path of fluid flow between the chambers. During operation, the pressure relief valve positively responds to pressure build-up in the primary chamber by allowing the damping liquid to bypass the orifice track and travel directly into the secondary chamber. As the pressure in the primary chamber recedes the pressure relief valve allows damping liquid to return.

4 Claims, 2 Drawing Sheets

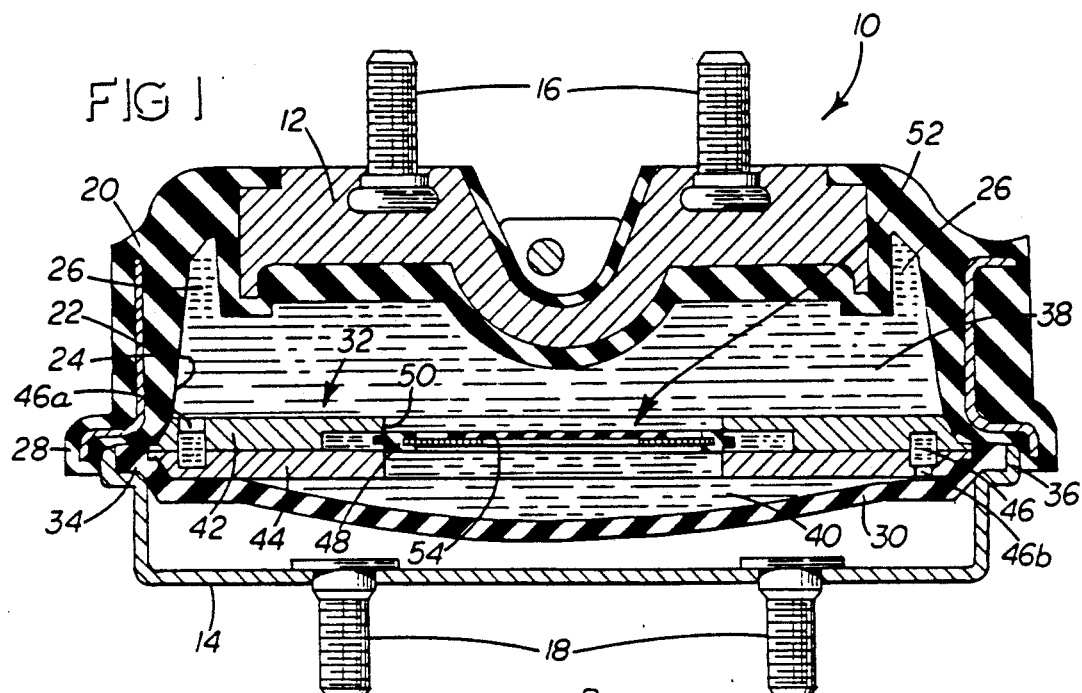
FIG 1
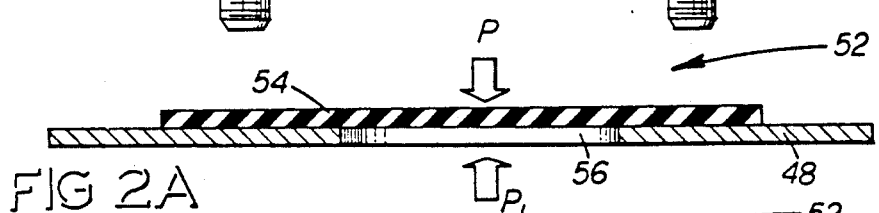
FIG 2A
FIG 2B
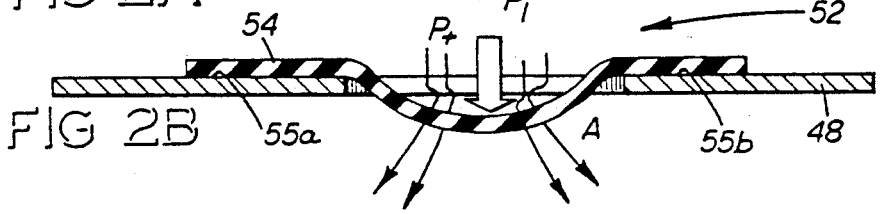
FIG 2C
FIG 2D
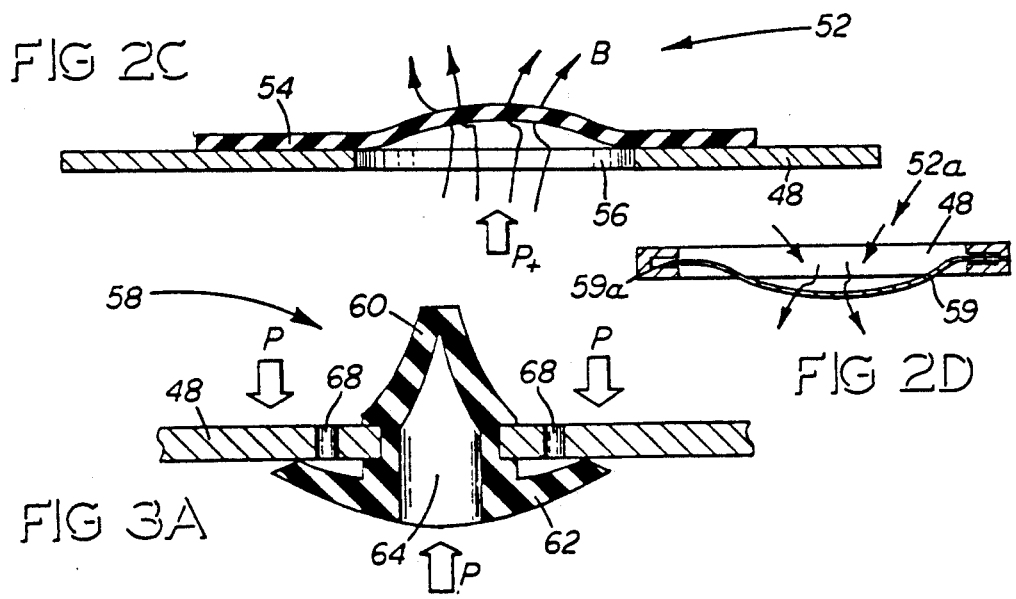
FIG 3A

HYDRAULIC ENGINE MOUNT WITH PRESSURE RELIEF VALVE

TECHNICAL FIELD

The present invention relates generally to hydraulic mounts for vibration damping and, more particularly to a vehicle mounted hydraulic mount assembly including a pressure relief valve providing dynamic rate and damping modification.

BACKGROUND OF THE INVENTION

A variety of mount assemblies are presently available to isolate vehicle vibrations, such as produced during operation of automobile and truck engines and transmissions. One of the most popular mounts today is the hydraulic/elastomeric mount of the type disclosed in U.S. Pat. No. 4,588,173 to Gold et al, issued May 13, 1986 and entitled "Hydraulic-Elastomeric Mount".

The hydraulic mount assembly of this prior invention includes a reinforced, hollow rubber body that serves as both a load supporting means and an integral part of the damping means. A hydraulic cavity partially formed by the body is closed by a resilient diaphragm. This cavity is partitioned by a plate into two chambers that are in fluid communication through a relatively large central orifice in the plate. The first or primary chamber is formed between the orifice plate and the body. The secondary chamber is formed between the plate and the diaphragm.

A decoupler is positioned in the central orifice of the plate and reciprocates and responds to vibrations. The decoupler movement alone accommodates small volume changes in the two chambers. When, for example, the decoupler moves in a direction toward the diaphragm, the volume of the primary chamber increases and the volume of the secondary chamber correspondingly decreases. In this way, at certain small vibratory amplitudes and generally higher frequencies, fluid flow between the chambers is substantially avoided and undesirable hydraulic damping is eliminated. In effect, this freely floating decoupler is a passive tuning device.

In addition to the large central orifice, an orifice track with a smaller flow passage is provided extending around the perimeter of the orifice plate. Each end of the track has an opening; one communicating with the primary chamber and the other with the secondary chamber. The orifice track therefore provides the hydraulic mount assembly with another passive tuning component, and when combined with the freely floating decoupler provides at least three distinct dynamic operating modes. The particular operating mode is primarily determined by the flow of fluid between the two chambers.

More specifically, small amplitude vibrating inputs such as from smooth engine idling or the like, produce no damping due to the action of the decoupler, as explained above. Large amplitude vibrating inputs produce high velocity fluid flow through the orifice track, and accordingly a high level of damping force, and desirable smoothing action is obtained. The high inertia of the hydraulic fluid passing through the orifice track contributes to the relatively hard mount characteristic in this mode. A third or intermediate operation mode of the mount occurs during medium amplitude inputs resulting in lower velocity fluid flow through the orifice track, generally resulting in a medium level of damping. In each instance, as the decoupler moves from one seated position to the other, a relatively limited amount of fluid can bypass the orifice track by moving around the sides of the decoupler to smooth the transition between the operational modes.

While this mount has proven highly successful in isolating engine/transmission vibration, it has shown a tendency to show a very sharp increase in dynamic rate at frequencies substantially above the resonant frequency of the engine/transmission. Research has indicated that the characteristics of fluid flow through the orifice track change in this situation and results in the tendency toward limiting fluid flow between chambers. It is theorized that this situation creates an internal pressure build-up, resulting in the undesirably high dynamic rate. Various designs have been tested to remedy this problem.

Other recent developments in hydraulic mount technology have lead to the advent of electronic control of the damping characteristics of the mount. Such a hydraulic mount is disclosed in U.S. Pat. No. 4,789,143 issued Dec. 6, 1988 and assigned to the assignee of the present invention. The mount described in U.S. Pat. No. 4,789,143 represents a modification of previous mounts in that it provides variable damping levels in response to sensed vehicle operating conditions. This active tuning of the mount is clearly a more sophisticated approach and has found general acceptance among engineers and others as an advancement in the art. The tuning is accomplished in this particular embodiment by the use of an infinitely variable sliding gate for selectively varying the size of the opening to the orifice track between the two chambers. By varying the opening size, the flow of damping fluid and thus the damping action of the mount can be changed.

Another approach to active tuning involves providing an inflatable bellows in the primary chamber of the mount. Such a mount is described in U.S. application Ser. No. 240,688, filed Sept. 6, 1988 and entitled "Hydraulic Engine Mount With Bellows Tuning". Transducers and an electronic controller regulate the flow of air into and out of the bellows in order to control the damping effect the mount.

Not only have these prior art mounts with active control proven to be successful in further modulating the response of the mount of vehicle operating conditions, but they can be programmed to operate in a manner particularly adapted to the vehicle configuration in the particular component, such as a motor or transmission, being damped. However, the disadvantage of these new and more sophisticated systems is the relatively higher cost of manufacturing and maintenance. Thus, it would be desirable to improve the operating response of a tunable hydraulic mount with an alternative approach to these prior art systems, and particularly the active systems. It would also be desirable to build in a control of internal pressure build-up created at operating frequencies substantially above the resonant frequency of the engine/transmission to maintain the dynamic rate of the amount at an acceptable level.

SUMMARY OF THE INVENTION

Accordingly, it is a primary object of the present invention to provide a hydraulic mount assembly including a passive tuning means operative to control the damping characteristics and provide operational improvements similar to the active tuning arrangements, especially at resonant frequencies.

It is another object of the invention to provide a tunable mount assembly that is simple in design and cost efficient compared to other mounts, such as those incorporating active tuning.

It is still another object of the invention to provide a hydraulic mount assembly retaining the desirable damping characteristics of the passive tunable prior art mounts at low frequencies yet selectively reducing the dynamic rate at higher frequencies.

Still another object of the invention is to provide a hydraulic mount assembly that improves the dynamic rate response at operating frequencies substantially above the resonant frequency of the mounted mass.

An additional object of the present invention is to provide an improved hydraulic mount assembly providing a means for relieving undesirably high pressure levels in the mount, thus improving the efficiency of its operation.

It is a further object of the present invention to provide a hydraulic mount assembly including means for allowing damping fluid to pass directly between chambers when the primary path for fluid flow in a damping mode is reduced.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a hydraulic mount assembly is provided to dampen and isolate engine and/or transmission vibrations during vehicle operation.

The mount assembly includes a pair of mounting members connected to each other through a hollow elastomeric body. This hollow body is closed by a resilient diaphragm so as to form a cavity for receiving a damping liquid such as engine antifreeze coolant. A partition or plate is provided to divide the fluid-filled cavity into two distinct chambers. A primary chamber is formed between the partition and the interior wall of the hollow body. A secondary chamber is formed between the partition and the interior wall of the diaphragm.

The partition further includes a central orifice that provides fluid communication between the chambers. A decoupler is positioned within this central orifice. This decoupler reciprocates within the central orifice in response to vibrations and effectively accommodates small volume changes between the two chambers.

In addition to the large central orifice, an orifice track provides fluid communication between the chambers. The orifice track takes the form of a relatively small flow passage provided in and extending around the perimeter of the partition.

According to an important aspect of this invention, the partition includes a pressure relief valve to allow direct fluid transfer between the chambers when the orifice track is restricted or choked off, denying it the opportunity to effectively pass hydraulic liquid between the chambers. Although not completely understood, it is believed that this can occur at operating frequencies substantially higher than the resonant frequency of the mounted mass. Advantageously, and as will be described in more detail below, the pressure relief valve in the partition provides a passive tuning mechanism particularly adapted to reduce the dynamic rate characteristics of the mount at higher frequencies, improving the overall operation. The mount is thus provided with a generally softer damping action and can be adjusted according to the resonant frequencies of a particular application on a vehicle.

In operation of the mount assembly of the present invention, vibration forces within the design amplitudes and frequencies produce alternate contraction and expansion of the primary chamber. When the vibration is initiated, the fluid first causes reciprocation of the decoupler. Certain small vibratory amplitudes usually produced at high frequencies, such a during smooth engine idling, are accommodated by the alternate increases and decreases in the chamber volumes resulting from decoupler reciprocation. Thus, significant fluid flow through the restricted orifice track between the chambers is avoided and undesirable damping is prevented.

In contrast, during large vibratory amplitudes, the decoupler reaches the limit of its travel and ceases reciprocating. In this situation, all damping fluid flow between the primary and secondary chambers occurs through the orifice track in the partition. The resistance to flow of the hydraulic fluid and the fluid inertia provide the desired damping during this mode.

More particularly, upon contraction of the primary chamber, fluid is forced through the orifice track into the secondary chamber. The fluid entering the secondary chamber stretches the diaphragm, thereby increasing the volume of the secondary chamber. Upon reversal of the force, the primary chamber is expanded and the stretched diaphragm contracts forcing fluid back into the primary chamber and completing the damping cycle. This action occurs as the operational frequency approaches a range substantially around resonant frequency of the mounted mass.

As vibration frequencies increase, the flow characteristics of the hydraulic fluid change. More particularly, the fluid transitions between laminar and turbulent flow. As a result, the orifice track opening can be effectively choked off, thus preventing continued flow through the orifice track. This situation can create a significant pressure build-up within the primary chamber of the mount, resulting in a very sharp increase in the dynamic rate characteristics.

In order to avoid this problem, the partition advantageously includes the pressure relief valve, as mentioned above. The valve responds to undesirably high pressure within the primary chamber by opening and allowing hydraulic liquid to flow directly into the secondary chamber, thus bypassing the choked-off orifice track. The valve is designed to maintain its closed position at pressure levels within the primary chamber generated at operational frequencies up to and substantially near the resonant frequency of the mounted mass. As the vibrational frequency reaches a critical level, creating an undesirably high pressure level in the primary chamber, the pressure relief valve positively responds to allow passage of the fluid from the primary chamber to the secondary chamber. The increased volume of fluid in the secondary chamber further stretches the diaphragm, storing energy that is released to force the hydraulic fluid to return through the pressure relief valve when the pressure in the primary chamber is reduced.

The overall dynamic rate of the mount is thus improved especially at frequencies substantially above the resonant frequency of the mounted mass. This results in more efficient damping action over the full range of vehicle operating conditions. Advantageously, the hydraulic mount assembly does not require external hardware such as transducers, controllers for the like. Therefore, the mount assembly is simple to manufacture as well as install and maintain in the vehicle.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of this specification, illustrates several aspects of the present invention and together with the description serves to explain the principles of the invention. In the drawing:

FIG. 1 is a cross-sectional view of a standard hydraulic mount assembly, including one embodiment of the pressure relief valve;

FIG. 2A is a cross-sectional view of one embodiment of the pressure relief valve shown in an equilibrium position;

FIG. 2B is a cross-sectional view of the pressure relief valve as in FIG. 2A but shown in a high pressure relief position;

FIG. 2C is a cross-sectional view of the pressure relief valve as in FIG. 2A but shown in a fluid return position;

FIG. 2D is a cross-sectional view of a modified relief valve very similar in pressure relief function to the pressure relief valve as in FIG. 2A;

FIG. 3A is a cross-sectional view of another embodiment of the pressure relief valve shown in equilibrium position;

Figure 3B:
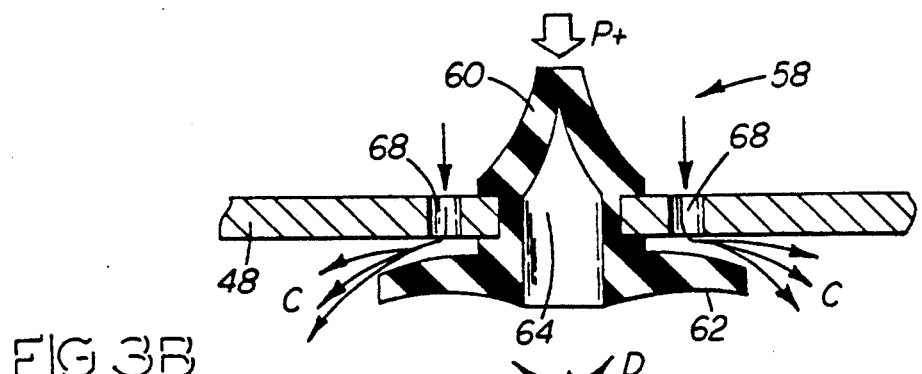
FIG. 3B is a cross-sectional view of the pressure relief valve as in FIG. 3A but shown in a high pressure relief position.

Reference will now be made in detail to the present preferred embodiment of the invention, an example of which is illustrated in the accompanying drawing.

DETAILED DESCRIPTION OF THE INVENTION

Reference is now made to the drawing and particularly to FIG. 1 showing an improved hydraulic mount assembly 10. This mount assembly 10 is particularly adapted for mounting a dynamic mechanical component, such as an internal combustion engine or transmission in a vehicle. The mount assembly 10 can, of course, be used in applications other than engine or transmission mounts, where controlled damping of vibration is desired especially with an improved damping action at higher frequencies.

The mount assembly shown in FIG. 1 includes a cast metal mounting member 12 and stamped sheet metal mounting member 14. The mounting members 12 and 14 each include a pair of mounting studs 16, 18, respectively. These studs 16, 18 project outwardly from the mounting members 12, 14 for attachment respectively to an engine (not shown) and an engine supporting cradle or frame of a vehicle (not shown).

A hollow, flexible body 20 interconnects the mounting members 12, 14. The body 20 is constructed of an elastomeric material, such as natural or synthetic rubber. More specifically, the body 20 may be molded to and about the mounting member 12 and includes an embedded stamped sheet metal retainer 22.

The body 20 defines a hollow cavity 24 for receiving a damping fluid such as engine antifreeze/coolant. Oppositely located voids 26 are formed in the body between the mounting member 12 and the retainer 22. These voids 26 provide some directional, dynamic rate control within the elastomeric body 20 and form a part of the damping liquid cavity 24.

Together, the mounting member 12, elastomeric body 20 and metal retainer 22 form a first subassembly or cover of the mount assembly 10. The retainer 22 includes an outwardly projecting collar 28 at its lower periphery. The collar 28 is formed to receive a second subassembly or base. The base comprises the mounting member 14, an elastomeric diaphragm 30 and a partition 32.

The elastomeric diaphragm 30 includes an annular rim portion 34 having a peripheral groove formed between the upper and lower shoulders. The shoulders are flexible so as to receive the outer edge of the partition 32. Thus, the partition 32 is sealingly engaged by the shoulders on opposite sides of the groove. The mounting member 14 is formed with a collar 36 to receive the rim portion 34 of the diaphragm 30. The collar 36 of member 14 fits within the collar 28 of the retainer 22.

The elastomeric diaphragm 30 closes the elastomeric body 20 so as to form therewith the closed damping cavity 24 mentioned above. This cavity 24 is divided by the partition 32 into a primary chamber 38 enclosed by the elastomeric body 20 and a secondary chamber 40 enclosed by the diaphragm 30.

The partition 32 is formed of a non-magnetic material, and includes a pair of plates 42, 44 with matching peripheries. The plates 42, 44 span the cavity 24 and cooperate to define a damping orifice track 46 interconnecting the chambers 38, 40.

A decoupler 48 in the form of rectangular plate is formed of metal or plastic and positioned in a central opening 50 within the partition 32. The decoupler 48 is mounted to allow limited vertical reciprocal movement in the partition 32. The upper and lower faces of the decoupler 48 engage damping fluid within the primary and secondary chambers 38, 40, respectively. As a result, the decoupler 48 provides reciprocating movement in response to minimum amplitude vibratory pressure build-ups in the chambers 38, 40 acting on opposite faces of the decoupler 48. This reciprocating movement toward and away from the chambers 38, 40 produces a limited volume change in the primary and secondary chambers 38, 40 such that it effects hydraulic decoupling.

The flow passage or orifice track 46 is provided in the partition 32 to furnish the main damping action of the mount assembly 10 through the flow of damping fluid between the primary and secondary chambers 38, 40. The orifice track 46 communicates between the two chambers via an opening 46a in the upper plate 42 and an orifice 46b in lower plate 44. The length of the track 46 can be varied or passively tuned to accurately control the particular resonance frequencies of the component being damped.

According to an important aspect of this invention, a pressure relief valve 52 is provided to assist the damping action and the tuning by controlling dynamic rate response at frequencies substantially above the resonant frequency of the mounted mass. One embodiment of the pressure relief valve 52 is depicted in FIG. 1 as a part of the hydraulic mount assembly 10 and more clearly shown by enlargement in FIGS. 2A-2C. The valve 52 includes an elastomeric membrane 54 that cooperates with an aperture 56 formed within the decoupler 48 to provide the appropriate pressure relief action as will be described in more detail below.

In operation, the hydraulic mount assembly 10 has substantially three modes of response to dampen vibration. During relatively smooth operation, such as during engine idling, small vibratory amplitudes are accommodated by the alternate increase and decrease in the volumes of the chambers 38, 40 resulting from reciprocation of the decoupler 48. Thus, significant fluid flow through the orifice track 46 is avoided and undesirable hydraulic damping under these operating conditions is prevented.

As vibration amplitudes and frequencies increase, the decoupler 48 reaches the limit of its travel. At this point, damping fluid flow is initiated and occurs along the orifice track 46. This hydraulic fluid flow provides the desired damping action to stabilize the resonant frequency of the mounted mass. The damping action provided by fluid flow along the orifice track 46 continues as vibratory frequencies increase.

Although not completely understood, it is theorized that at frequencies substantially above the resonant frequency of the mounted mass in prior art devices, that internal pressure builds to an unacceptable level within the primary chamber. The pressure build-up alters the flow characteristics of the damping fluid and causes the orifice track opening to be restricted, or ultimately to choke off. Continued fluid flow through the orifice track is prevented, generating an undesirable increase in the dynamic rate of the hydraulic mount assembly. More particularly, since the damping liquid has nowhere to move, it becomes stiffer as the vibrational frequency increases. The resulting pressure build-up causes the assembly components to likewise stiffen. Consequently, at operating frequencies substantially above the resonant frequency of the mounted mass, it is desirable to prevent the build-up of pressure within the primary chamber.

In accordance with the present invention and as shown in FIGS. 2A-2C, the pressure relief valve 52 provides the solution. The valve is illustrated as a strip of relatively stiff and/or low resiliency rubber membrane attached at its ends by a coating of adhesive 55a, 55b or the like. The sides of the strip engage and seal the side edges of the aperture 56 but are not attached. FIG. 2A depicts the pressure relief valve 52 in its pressure equilibrium position; i.e. at low frequency, low vibratory amplitude operation where the pressure exerted by the damping fluid within the primary and secondary chambers 38, 40 on opposing faces of the membrane 54 is substantially the same, as indicated by pressure arrows P, P1.

As the vibrational frequency passes the critical level leading to an undesirable build-up of pressure in the upper chamber 38, the elastomeric membrane 54 of the pressure relief valve 52 responds by stretching due to the force (pressure arrow P+) exerted by the damping fluid in the primary chamber 38, as shown in FIG. 2B. The elastomeric membrane 54 deforms in a concave fashion and pops through the aperture 56 along the free sides to a position below the horizontal plane of the decoupler. This allows openings to form on both sides of the membrane 54 and fluid to pass directly into secondary chamber 40 as indicated by flow arrows A, bypassing the choked-off orifice track 46.

It can be appreciated that as the damping fluid is forced into secondary chamber 40, diaphragm 30 stretches to accept the increased volume within the secondary chamber 40. As the internal pressure within primary chamber 38 subsides, the energy stored within diaphragm 30 releases to force the excess damping fluid (as shown by pressure arrow P+) to flow back into primary chamber 38 through the side opening, as shown in FIG. 2C. The elastomeric nature of the membrane 54 provides the appropriate flexibility to allow it to be deformed so as to bulge into the primary chamber 38 to allow damping fluid to pass back through the openings from the secondary chamber 40 into the primary chamber 38, as indicated by action arrows B. As the opposing pressures between the two chambers 38, 40 continue to equalize the elastomeric membrane 54 returns to its equilibrium closing off the aperture, position as depicted in FIG. 2A.

It should be appreciated that the pressure relief valve is designed to achieve the pressure relief function in the mount assembly 10 as described above when critical vibrational frequencies generate the pressure build-up within the primary chamber 38, while desirably maintaining the mount assembly's normal operational condition at lower operational frequencies. This allows the hydraulic mount assembly 10 to provide the proper normal damping action resulting from the flow of damping fluid between the chambers 38, 40 through the orifice track 46. The relief valve 52 can be optimally designed for desirable response over the entire range of operational input frequencies with appropriate considerations of size and physical properties such as stiffness and resiliency of the elastomeric membrane 54.

A comparable embodiment of pressure relief valve 52a is presented in FIG. 2D. It is configured similarly to the valve 52 shown in FIGS. 2A-2C but modified by utilizing a thin strip of metal 59, preferably stainless steel, as the flexible pressure relief member in fluid communication with both chambers 38, 40. The metal strip 59 is fixed at one end within the decoupler 48 and slides longitudinally at its other end within groove 59a. The pressure relief valve 52a as shown in FIG. 2D responds similarly to the valve 52 as described above in relation to FIGS. 2A-2C, reciprocating and flexing between chambers 38, 40 to allow bypass of the damping fluid. The metal strip 59 is depicted in its pressure relief position.

Figure 3C:
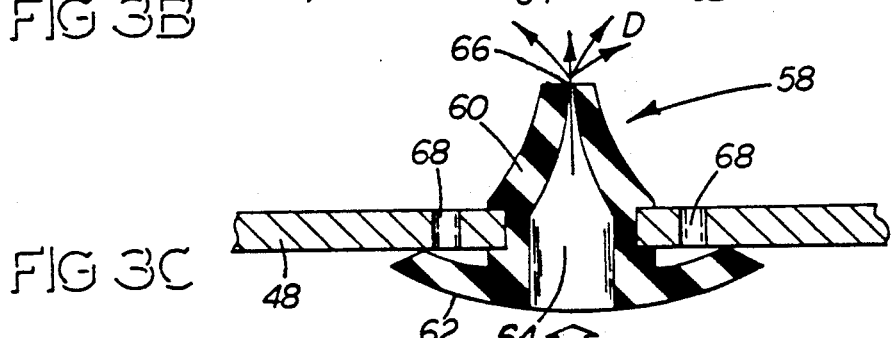
FIG. 3C is a cross-sectional view of the pressure relief valve as in FIG. 3C but shown in a fluid return position.

Another embodiment of a value structure that provides the appropriate pressure relief function is shown in FIGS. 3A-3C, and designated generally as relief valve 58. This embodiment includes a nipple 60 extending into primary chamber 38 and a flexible ring 62 that extends into the secondary chamber 40. The pressure relief valve 58 including nipple 60 and ring 62 is of integral design and adapted to be fixed to and mounted within an orifice in the partition 32 in grommet-like fashion. It can be appreciated that FIGS. 3A-3C depict the pressure relief valve 58 being mounted on the decoupler 48.

The relief valve 58 includes a selectively open flow passage 64 tapered toward the primary chamber 38. A slit 66 (see FIGS. 5 and 6) is formed in the top of nipple 60 that allows the passage of pressurized damping fluid, as will be described in more detail below.

Advantageously cooperating with the pressure relief valve 58 are a plurality retroflow orifices 68 formed in the decoupler 48. The periphery of ring 62 forms a sealing rim that engages the lower face of decoupler 48 at a radial distance from the center of flow passage 64. As is shown in FIG. 3A, the inherent resiliency of the ring 62 operates to block the orifices 68 so as to normally prevent fluid communication between the chambers 38, 40. This allows the hydraulic mount assembly 10 to provide the appropriate damping action at normal operating frequencies while facilitating the pressure relief function at critically high frequencies, as will be further described below.

FIG. 3A shows pressure relief valve 58 in its closed or static position. Pressure arrows P indicate pressure equilibrium as applied to this configuration. The stiffness of nipple 60 prevents slit 66 from opening to provide a passage for damping fluid to flow. The engagement maintained between the ring 62 and the lower face of decoupler 48 prevents fluid from entering orifices 68 and passing through to secondary chamber 40. Thus, advantageously, at operating frequencies approaching and substantially around the resonant frequency of the mounted mass, the pressure relief valve 58 remains closed so that relief flow is prevented and the appropriate damping action is produced by the fluid flow between chambers around the orifice track 46.

When an undesirably high pressure (pressure arrow P+) is reached in primary chamber 38, valve 58 responds positively to provide pressure relief as shown in FIG. 3B. The pressure in primary chamber 38 generates the appropriate force to urge ring 62 to flex in the direction of the lower chamber 40. This flexing action disengages the rim from the lower face of decoupler 48. This results in the allowance of damping fluid to pass through orifices 68 from the primary chamber 38 directly into the secondary chamber 40 as shown by action arrows C.

As described above, the increased volume in the secondary chamber 40 resulting from the forced entry of damping fluid into secondary chamber 40 stores energy in diaphragm 30 that is released during the transition of pressure differential between chambers 38 and 40; that is, as pressure subsides in primary chamber 38 damping liquid is forced back through the pressure relief valve 58 as shown in FIG. 3C (again note pressure arrow P+). The ring 62 of valve 58 snaps back to engage the lower surface of decoupler 48, closing the orifices 68 between chambers 38 and 40. The damping fluid is forced through flow passage 64, urging the sides of nipple 60 to flex outwardly. This action causes slit 66 to open, allowing the bypass of fluid flowing directly from the secondary chamber 40 to the primary chamber 38 as indicated by action arrows D. It can be appreciated that, as with the embodiment described above, the specific structural design and material properties are considered to provide a pressure relief valve that advantageously responds in appropriate fashion to undesirably high fluid pressure at very high operating frequencies while remaining closed at lower frequencies.

Figures 4A, 4C:
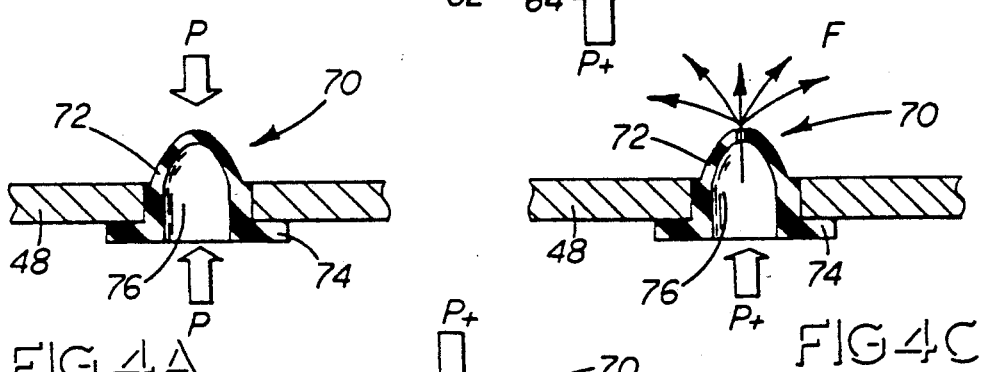
FIG. 4A is a cross-sectional view of another embodiment of the pressure relief valve shown in the equilibrium position.
FIG. 4C is a cross-sectional view of the pressure relief valve as in FIG. 4A but shown in a fluid return position.
Figure 4B:
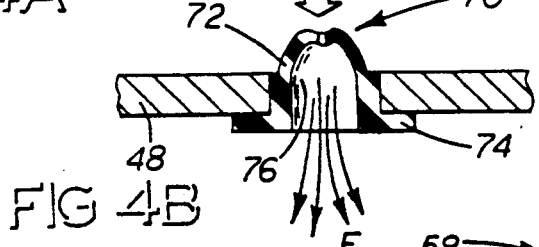
FIG. 4B is a cross-sectional view of the pressure relief valve as in FIG. 4A but shown in a high pressure relief position.

Another embodiment of a pressure relief valve is shown in FIGS. 4A-4C and generally designated by reference numeral 70. The valve 70 includes a cap 72 that extends into primary chamber 38 and a flange 74 attached to the underside of partition 32. The valve 70 including the cap 72 and flange 74 is of integral design and adapted to be fixed to and mount within an orifice in grommet-like fashion. FIGS. 4A-4C depict pressure relief valve 70 as being mounted on the decoupler 48.

Valve 70 also includes selectively open flow passage 76 within its interior. A hole (see FIGS. 4B, 4C) is fabricated in the cap 72 to provide the appropriate passage for damping fluid.

FIG. 4A shows valve 70 in its closed position. The opposing pressures denoted by P are of substantially equal amount. It can be appreciated that the stiffness of cap 72 prevents the hole fabricated therein from opening to allow passage of damping fluid between chambers 38, 40 through valve 70.

FIG. 4B indicates the response of valve 70 to undesirably high pressure developed within primary chamber 38. As can be appreciated from the figure, the pressure P+ causes a slight retro-deformation in cap 72, allowing the hole therein to open. The force of the damping fluid influences it to pass through the hole directly into the secondary chamber as shown by flow arrows E, and thus avoiding the choked-off orifice track 46.

The valve 70 responds similarly to those described in the previous embodiments to provide fluid return from the secondary chamber 40 to the primary chamber 38 as depicted in FIG. 4C. The pressure P+ exerted by the fluid in the secondary chamber 40 forces it through the hole in cap 72 to return to primary chamber 38 as shown by action flow F. As with the previous embodiments, the optimal or tuned design of valve 70 for utilization in an assembly for mounting a particular component is determined with consideration to appropriate weight and vibration properties.

While it is contemplated that pressure relief valve 52 as shown in FIGS. 2A-2C is specifically designed to directly cooperate with decoupler 48, it can be appreciated that valves 58 and 70 as shown in FIGS. 3A-3C and FIGS. 4A-4C, respectively, may be mounted to either the orifice plates, 42-44 or the decoupler 48. The valves 58/70 respond identically when mounted in either location, and thus the design choice is determined with reference to such considerations as allowable clearance and sealing attributes for a particular application.

Figures 5, 6:
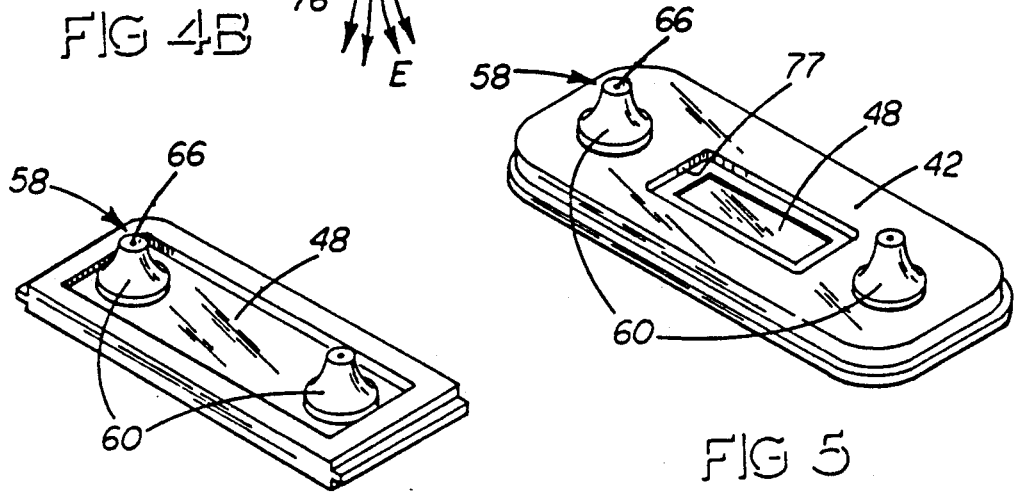
FIG. 5 is a perspective view of the orifice plate of the hydraulic mount assembly showing an embodiment of the pressure relief valve attached directly to the orifice plate.
FIG. 6 is a perspective view of the decoupler of the hydraulic mount assembly showing one embodiment of the pressure relief valve attached directly to the decoupler.

The mounting alternatives are more clearly shown in FIGS. 5 and 6, with the pressure relief valve 58 as the design embodiment. FIG. 5 depicts the valve 58 as being mounted to the orifice plates 42, 44. The perspective view as provided in that figure shows the nipples 60 extending from the upper orifice plate 42. FIG. 5 also more clearly presents the slit 66 provided at the top of nipple 60 that facilitates the fluid return function from the secondary chamber 40 to the primary chamber 38.

FIG. 6 shows the same valve 58 mounted on the decoupler 48. It can be further appreciated from FIGS. 5 and 6 that the design choice of mounting the valves 58/70 on the decoupler 48 requires the orifice plate 42, 44 to be provided with a larger opening (as shown by 77 in FIG. 5) to allow the appropriate clearance for valves 58/70.

In summary, numerous benefits result from employing the concepts of the present invention. The hydraulic mount assembly 10 includes a pressure relief valve 52/58/70 for functioning to actively relieve pressure developed in the primary chamber 38 of mount assembly 10 at operational frequencies substantially above the normal resonant frequencies of the mounted mass. The valves 52/58/70 positively respond to allow damping fluid to pass directly between primary chamber 38 and secondary chamber 40 when the critically high operational frequencies cause the orifice track to be restricted or closed off. The valve 52/58/70 also allows damping fluid to pass back from the secondary chamber 40 to the primary chamber 38 once the pressure within primary chamber 38 recedes. Advantageously, the valve 52/58/70 is designed so as to maintain its closed position at frequencies approaching and substantially around the resonant frequency of the mounted mass so as to allow mount assembly 10 to provide the desired damping action provided by the cooperative interaction between the decoupler and the orifice plates including the orifice track 46.

The foregoing description of a preferred embodiment of the invention has been presented for purposes of illustration and description. It is not intended to be exhaustive or to limited the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variation are within the scope of the invention as determined by the appended claims when interpreted in accordance with breadth to which they are fairly, legally and equitably entitled.

We claim:

1. A hydraulic mount assembly, comprising:
a pair of mounting members;
a hollow body connected to said mounting members;
a resilient diaphragm closing said hollow body and forming therewith a closed cavity that is filled with liquid;
means for partitioning said cavity into a primary chamber enclosed by said body and a secondary chamber enclosed by said diaphragm;
an orifice track in said partitioning means connecting said chambers so as to effect damping; and
a pressure relief valve between said primary chamber and said secondary chamber for allowing said liquid to pass directly between said chambers to relieve undesirably high pressure in said primary chamber and for further allowing return flow of said liquid to said primary chamber for re-establishment of pressure equilibrium, said pressure relief valve comprising an elastomeric membrane attached to said partitioning means and covering an orifice in said partitioning means, said membrane adapted to allow reciprocal stretching movement into said chambers;
whereby appropriate damping action is facilitated and the dynamic rate of said mount is maintained at an acceptable level.

2. A hydraulic mount assembly, comprising:
a pair of mounting members;
a hollow body connected to said mounting members;
a resilient diaphragm closing said hollow body and forming therewith a closed cavity that is filled with liquid;
means for partitioning said cavity into a primary chamber enclosed by said body and a secondary chamber enclosed by said diaphragm;
an orifice track in said partitioning means connecting said chambers so as to effect damping; and
a pressure relief valve between said primary chamber and said secondary chamber for allowing said liquid to pass directly between said chambers to relieve undesirably high pressure in said primary chamber and for further allowing return flow of said liquid to said primary chamber for re-establishment of pressure equilibrium, an elastomeric member fixed to and mounted within an orifice in said partitioning means, said elastomeric member defining a selectively open flow passage responsive to pressure differential between said chambers;
whereby appropriate damping action is facilitated and the dynamic rate of said mount is maintained at an acceptable level.

3. A hydraulic mount assembly, comprising:
a pair of mounting members;
a hollow body connected to said mounting members;
a resilient diaphragm closing said hollow body and forming therewith a closed cavity that is filled with liquid;
means for partitioning said cavity into a primary chamber enclosed by said body and a secondary chamber enclosed by said diaphragm;
an orifice track in said partitioning means connecting said chambers so as to effect damping; and
a pressure relief valve between said primary chamber and said secondary chamber for allowing said liquid to pass directly between said chambers to relieve undesirably high pressure in said primary chamber and for further allowing return flow of said liquid to said primary chamber for re-establishment of pressure equilibrium, said pressure relief valve comprising a nipple portion extending into said primary chamber having a slit at a distal end, a flexible ring means extending into said secondary chamber and covering an orifice, said flexible ring having rim means for engaging a lower face of said partitioning means covering said orifice;
whereby appropriate damping action is facilitated and the dynamic rate of said mount is maintained at an acceptable level.

4. A hydraulic mount assembly, comprising:

a pair of mounting members;

a hollow body connected to said mounting members;

a resilient diaphragm closing said hollow body and forming therewith a closed cavity that is filled with liquid;

means for partitioning said cavity into a primary chamber enclosed by said body and a secondary chamber enclosed by said diaphragm;

an orifice track in said partitioning means connecting said chambers so as to effect damping; and a pressure relief valve between said primary chamber and said secondary chamber for allowing said liquid to pass directly between said chambers to relieve undesirably high pressure in said primary chamber and for further allowing return flow of said liquid to said primary chamber for re-establishment of pressure equilibrium, said pressure relief valve comprising an elastomeric member fixed to and mounted within an orifice in said partitioning means, said elastomeric member defining a selectively open flow passage responsive to pressure differential between said chambers, said elastomeric member comprising a cap extending into said primary chamber having a hole to be opened by differential pressure between said chambers;

whereby appropriate damping action is facilitated and the dynamic rate of said mount is maintained at an acceptable level.

* * * * *